United States Patent
Perez et al.

(10) Patent No.: US 9,156,339 B1
(45) Date of Patent: Oct. 13, 2015

(54) HAIL COVER FOR VEHICLE

(71) Applicants: Roberto R. Perez, Terrell, TX (US);
Patricia P. Perez, Terrell, TX (US)

(72) Inventors: Roberto R. Perez, Terrell, TX (US);
Patricia P. Perez, Terrell, TX (US)

( * ) Notice: Subject to any disclaimer, the term of this patent is extended or adjusted under 35 U.S.C. 154(b) by 0 days.

(21) Appl. No.: 14/211,627

(22) Filed: Mar. 14, 2014

Related U.S. Application Data

(60) Provisional application No. 61/788,888, filed on Mar. 15, 2013.

(51) Int. Cl.
*B60J 11/04* (2006.01)

(52) U.S. Cl.
CPC ........................ *B60J 11/04* (2013.01)

(58) Field of Classification Search
CPC .................. B60J 11/00; B60J 11/04
USPC ............. 296/136.01, 136.02, 136.03, 136.07, 296/136.1, 136.13; 150/166
See application file for complete search history.

(56) References Cited

U.S. PATENT DOCUMENTS

| | | | |
|---|---|---|---|
| 4,294,483 A | 10/1981 | Ferris | |
| 5,241,977 A * | 9/1993 | Flores et al. | 135/88.06 |
| 5,242,206 A * | 9/1993 | Heck | 296/136.02 |
| 5,275,460 A * | 1/1994 | Kraus | 296/136.13 |
| 5,287,904 A | 2/1994 | Smith et al. | |
| 5,350,000 A | 9/1994 | Wang | |
| 5,351,829 A * | 10/1994 | Batsford | 206/522 |
| 5,664,825 A * | 9/1997 | Henke et al. | 150/166 |
| D402,622 S * | 12/1998 | Rogers | D12/401 |
| 5,890,525 A | 4/1999 | Shores | |
| 6,044,881 A | 4/2000 | Welch et al. | |
| 6,056,347 A * | 5/2000 | D'Adamo | 296/136.02 |
| 6,070,629 A * | 6/2000 | Whiteside | 150/166 |
| 6,439,644 B1 | 8/2002 | Jester | |
| 7,360,820 B2 | 4/2008 | Tellez | |
| 2007/0284023 A1 | 12/2007 | Sitarz | |

* cited by examiner

*Primary Examiner* — Hilary Gutman
(74) *Attorney, Agent, or Firm* — Robert C. Montgomery; Montgomery Patent & Design LP

(57) ABSTRACT

A hail cover for a vehicle is provided having a deformable, inflatable body member with attachment straps and an inflation tube extending therefrom. The body member has a plurality of apertures disposed therethrough. The body member is placed over top portions of a vehicle and secured thereto with the attachment straps. Once secured a user can enter their vehicle and inflate the cover to create a protective layer for the vehicle while safely inside of the vehicle. The plurality of apertures provide for a fluid-dynamic structure to the cover to assist with stabilizing the position of the cover during turbulent winds.

20 Claims, 5 Drawing Sheets

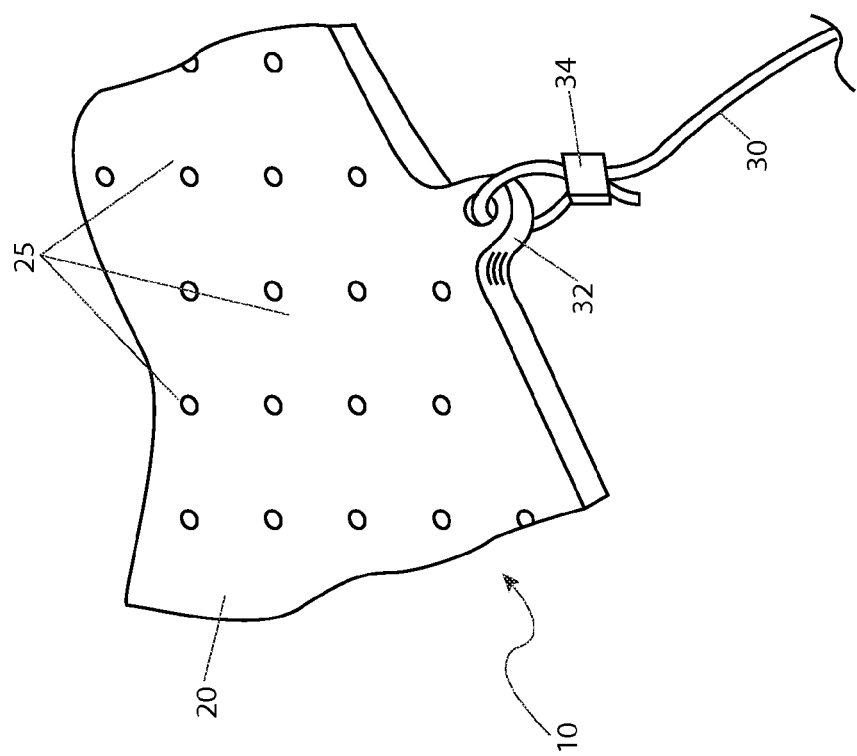

HAIL COVER FOR VEHICLE

RELATED APPLICATIONS

The present invention was first described in and claims the benefit of U.S. Provisional Application No. 61/788,888, filed Mar. 15, 2013, the entire disclosures of which are incorporated herein by reference.

FIELD OF THE INVENTION

The present invention relates to an inflatable cover configured to be removably attached to a vehicle for protecting said vehicle from impact of foreign objects.

BACKGROUND OF THE INVENTION

The love affair people have with their automobiles is a well-known fact. Countless hours are spent cleaning, waxing, and detailing cars every day, just so they can look their best as they drive down the road. While physical maintenance such as that outlined above is an important part of keeping a vehicle looking good, protecting a vehicle from environmental dangers is even more important. For those vehicle owners without a garage, a common tool to aid in this effort is the vehicle cover. While the vehicle cover does provide some protection from environmental and light physical dangers, strong physical damage, such as from hail or light tree branches, can overcome its protection. Such damage from hailstorms is immediate, long lasting, and costly. Accordingly, a need has developed for a means by which automobiles can be protected against common environmental damage, especially hail, in a quick, easy, and effective manner. The development of the hail cover fulfills this need.

The apparatus of the present invention is a cover that provides environmental protection for vehicles, especially against hail storms. It is an inflatable cover that can be carried in the vehicle when deflated, but takes the form of a large inflatable shield when inflated. It is provided with apertures disposed throughout the cover to provide for a fluid-dynamic structure, which assists with stabilizing the position of the cover during turbulent winds. In its deflated state, the cover is unfolded and placed upon the hood, passenger section, and trunk of the vehicle. Strong elastic straps are provided to secure it to the chassis and hold the invention in place. Next, the cover is inflated by way of an inflation tube, which may be accessed by an occupant while inside the vehicle. After use, the invention can be quickly deflated by way of a valve, and folded for storage.

Prior art in this field consists of reinforced covers and inflatable covers, but none with the added utility that the present invention provides. Prior art reinforced covers consist of padded covers or covers having rigid plank members incorporated into the cover. These covers are not inflatable/deflatable and tend to be unwieldy. Prior art inflatable covers do exist, but with limitations that the present invention overcomes. These prior art inflatable covers do not provide a means to inflate/deflate the cover from an occupant of a vehicle while seated inside the vehicle. They also fail to provide an option to inflate the cover by a human or an ancillary compressed air source. Furthermore, these prior art inflatable covers fail to provide the fluid-dynamic aperture structure to assist with stabilizing the position of the cover during turbulent winds.

It is an objective of the present invention to provide a vehicle cover that effectively protects a vehicle from bombardment of hail and similar objects.

It is a further objective of the present invention to provide a vehicle cover that is inflatable/deflatable and configured to be easily foldable, wieldable, and storable.

It is a further objective of the present invention to provide a vehicle cover that may be inflatable/deflatable from an occupant of a vehicle while the occupant is inside the vehicle and the cover is placed on the vehicle.

It is a further objective of the present invention to provide a vehicle cover that may be manually inflated by a human or inflated by connection to an ancillary compressed air source.

It is a further objective of the present invention to provide a quick and easy securement mechanism to secure the vehicle cover to a vehicle while in use.

It is a further objective of the present invention to provide a vehicle cover with a fluid-dynamic aperture structure to assist with stabilizing the position of the cover during turbulent winds.

SUMMARY OF THE INVENTION

The apparatus is an inflatable/deflatable cover, intended to be used during inclement weather, which is placed upon upper surfaces of a vehicle and secured to the vehicle via straps. The cover is intended to protect the exterior of the vehicle by shielding it from a bombardment of hail and similar debris. The apparatus is envisioned to be fabricated in several sizes to accommodate various vehicle sizes and styles. A plurality of securing straps is provided along perimeter edge portions to affix the cover to subjacent chassis portions of the vehicle. Once placed on the vehicle, air is imparted into the cover through an inflating tube. This inflating tube is preferably located on a side of the cover commensurate with the driver-side of the vehicle so that an occupant in the driver's seat may extend the inflation tube in through the driver-side window and inflate/deflate the apparatus without having to be exposed to the inclement weather conditions. A valve is further disposed on the inflation tube to enable retention of air within the cover or to enable deflation of the cover.

A beneficial feature of the apparatus is the fluid-dynamic aperture structure of the cover. A plurality of apertures is disposed throughout the cover, each extending from an outwardly-facing layer to an inwardly facing layer of the cover, but configured to maintain a self-contained bladder of the cover so that it can be inflated. The purpose of these apertures are to provide a means for air flow and equalization of pressure between the outwardly-facing and inwardly facing layers during turbulent wind conditions. Another beneficial feature is that the inflation tube is configured to receive air from a human mouth or from an ancillary compressed air source. Another beneficial feature is that the securing straps are preferably elastic and provided with hook fasteners.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 3b is a close-up view of a securing strap portion 30 of the hail cover 10 for a vehicle 100, according to a preferred embodiment of the present invention; and, FIG. 4 is a sectional view of the hail cover 10 for a vehicle 100 taken along section line A-A (see FIG. 3a), according to a preferred embodiment of the present invention.

Figure 1:
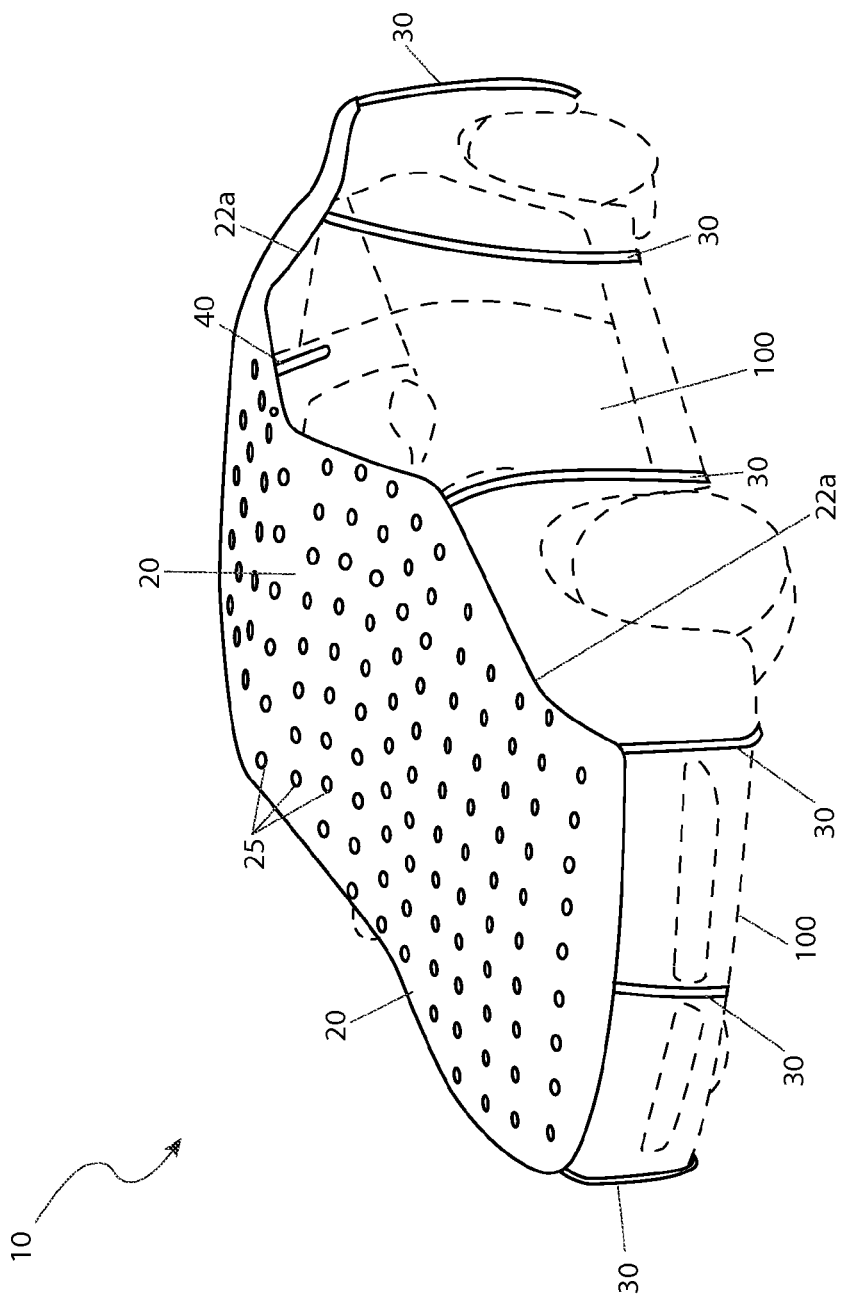
FIG. 1 is an environmental perspective view of a hail cover 10 for a vehicle 100 depicting an in-use state, according to a preferred embodiment of the present invention.

DESCRIPTIVE KEY 10 hail cover
20 cover
22a left side edge
22b right side edge
23a front edge
23b rear edge
24a outer layer
24b inner layer
25 aperture
27 air flow
28 interior
30 securing strap
32 eyelet
34 fastener
36 hook end
40 inflating tube
42 adapter
44 valve
60 compressed air source
62 barbed adapter
100 vehicle

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a hail cover (herein described as the "apparatus") 10, which provides a means for protecting a vehicle 100 during a hail storm or similar damaging inclement weather conditions.

Referring now to FIG. 1, an environmental perspective view of the apparatus 10 depicting an in-use state, according to the preferred embodiment of the present invention, is disclosed. The apparatus 10 is positioned upon all upper surfaces of a vehicle 100 during inclement weather, thereby protecting and shielding an exterior of the vehicle 100 from dents and other damages. The apparatus 10 is envisioned to be fabricated in several sizes to accommodate various vehicle sizes and styles.

The apparatus 10 provides an inflatable cover 20 having a plurality of securing straps 30 attached along edge portions 22a, 22b, 23a, 23b, which provide a means to affix the apparatus 10 to subjacent chassis portions of the vehicle 100. The apparatus 10 further includes a means of manual inflation via an inflating tube 40, also located along a perimeter edge (depicted as being disposed on the left side edge in FIG. 2, but can be disposed on any edge portion 22a, 22b, 23a, 23b), being accessible to a user while positioned safely within the vehicle 100.

Figure 2:
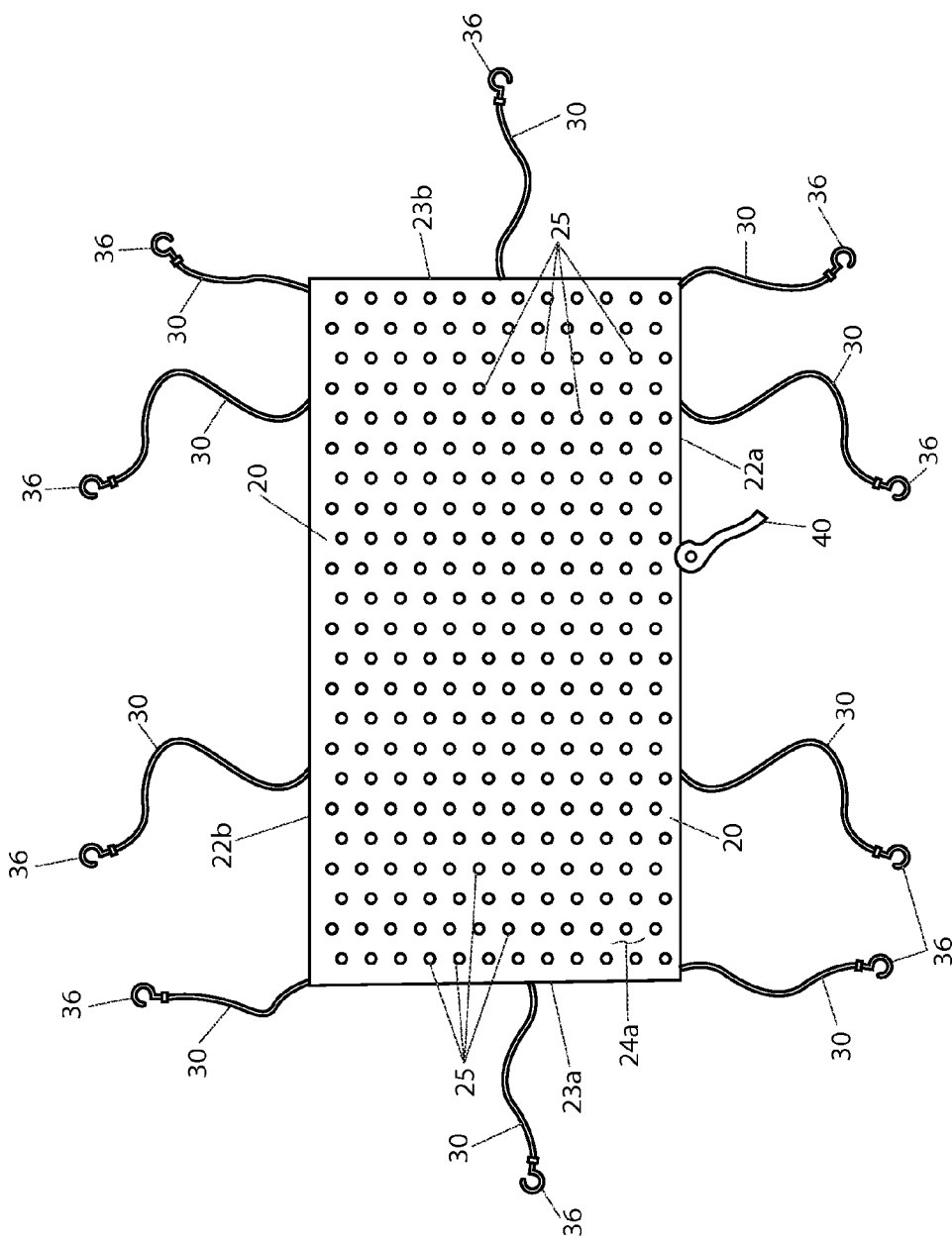
FIG. 2 is a top view of the hail cover 10 for a vehicle 100, according to a preferred embodiment of the present invention.

Referring now to FIG. 2, a top view of the apparatus 10, according to a preferred embodiment of the present invention, is disclosed. The cover 20 is fabricated from a durable airtight heavy-gauge material such as plastic, nylon, or the like, which offers impact protection when inflated, and can be folded or rolled up for storage when deflated. The inflatable cover 20 preferably takes on a generally rectangular form further including a left side edge 22a, a right side edge 22b, a front edge 23a, and a rear edge 23b. The cover 20 also includes parallel surface portions including an outwardly-facing layer 24a and an inwardly-facing layer 24b (see FIG. 4). It is envisioned for the apparatus 10 to be employed with the inwardly-facing layer 24b lying adjacent to a top surface of the vehicle 100 and the front edge 23a is positioned commensurately with a front of the vehicle 100 so that the left side edge 22a is positioned commensurately with the driver's side of the vehicle for left-side driven vehicles, but employment of the apparatus 10 is certainly not limited to such configuration.

The cover 20 provides a plurality of securing straps 30 arranged along perimeter edges 22a, 22b, 23a, 23b. An embodiment of the apparatus 10 is depicted here having securing straps 30 located at corner portions of the cover 20 and at a plurality of intermediate locations along the perimeter edges 22a, 22b, 23a, 23b; however, it is understood that different numbers of, and locations of, the securing straps 30 would be determined based upon a size and shape of the cover 20 and a corresponding vehicle 100.

The cover 20 comprises a plurality of equally-spaced apertures 25, each preferably approximately one-quarter (¼ in.) of an inch in diameter and arranged in rows that are substantially parallel and orthogonal to each other; however, other size apertures 25 and arrangements thereof may be utilized without deviating from the teachings of the apparatus 10. Nonetheless, the number of, the size of, and the arrangement of apertures 25 must be such as to not detract from the ability of the apparatus 10 to provide a barrier-protection from hail and other debris bombarding the cover 20. The apertures 25 extend through the cover 20 to communicate an air flow 27 through the cover 20, thereby acting to stabilize the apparatus 10 upon the vehicle 100 during turbulent windy conditions (see FIG. 4).

Figure 3A:
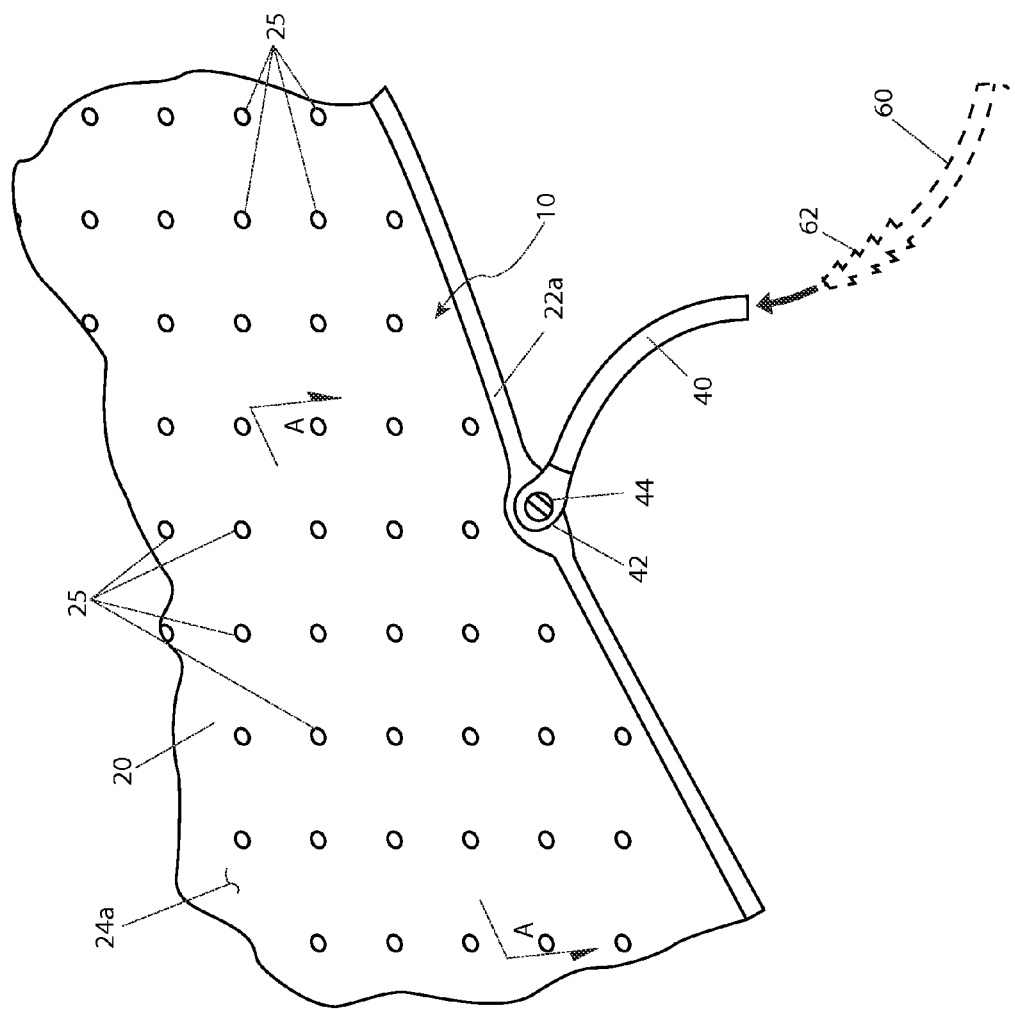
FIG. 3a is a close-up view of a left side edge 22a of the hail cover 10 for a vehicle 100 depicting an inflating tube portion 40, according to a preferred embodiment of the present invention.

Referring now to FIG. 3a, a close-up view of a left side edge portion 22a of the apparatus 10, according to a preferred embodiment of the present invention, is disclosed. A portion of the left side edge 22a of the cover 20 is illustrated here including an inflating tube 40. The inflating tube 40 provides a means of inflating the cover portion 20 of the apparatus 10. The inflating tube 40 is envisioned to provide a plastic or rubber section of tubing positioned near the driver-side window, thereby enabling the driver to route the inflating tube 40 into the vehicle 100 for subsequent inflating while occupying a safe interior position. The inflating tube 40 is envisioned to be utilized in a manual manner; however, the inflating tube 40 may also utilize a compressed air source 60 such as hose that is extended from a portable air compressor being equipped with a barbed adapter 62, or equivalent means, to provide pneumatic connection to an end portion of the inflating tube 40. Although the inflating tube 40 is shown being disposed on the left side edge 22a, it is understood that the inflating tube 40 may be disposed on any perimeter edge 22a, 22b, 23a, 23b.

The cover 20 provides an attachment means to the inflating tube 40 via an integrally-molded or otherwise affixed adapter 42 along the left side edge 22a. Although the affixing adapter 42 is shown being disposed on the left side edge 22a, it is understood that the affixing adapter 42 may be disposed on any perimeter edge 22a, 22b, 23a, 23b. The adapter 42 further includes a manually-operated valve 44. The adapter 42 and valve 44 conduct and retain a flow of air 27 to provide fluid communication between the inflating tube 40 and an interior 28 of the cover 20, and also enable the cover 20 to be deflated after use. The valve 44 is envisioned to be a plastic in-line quarter-turn ball valve unit, or equivalent flow control device.

Referring now to FIG. 3b, a close-up view of a securing strap portion 30 of the apparatus 10, according to a preferred embodiment of the present invention, is disclosed. The cover 20 includes a plurality of securing straps 30 along the perimeter edges 22a, 22b, 23a, 23b. Each securing strap 30 is to be attached to the cover 20 preferably using an integrally molded eyelet 32. The securing strap 30 is routed through the eyelet 32 forming a loop, which is secured using a crimping-type fastener 34; however, it is understood that other attachment methods may be employed with equal benefit such as, but not limited to: sewing techniques, adhesive bonding, plastic welding and the like, without limiting the scope of the apparatus 10. The securing straps 30 are used to retain the apparatus 10 upon the vehicle 100. Each securing strap 30 is envisioned to comprise an elastic cord, similar to a bungee-type cord, including an integral hook end 36 to provide removable attachment to undercarriage and/or similar portions of the vehicle 100.

Figure 4:
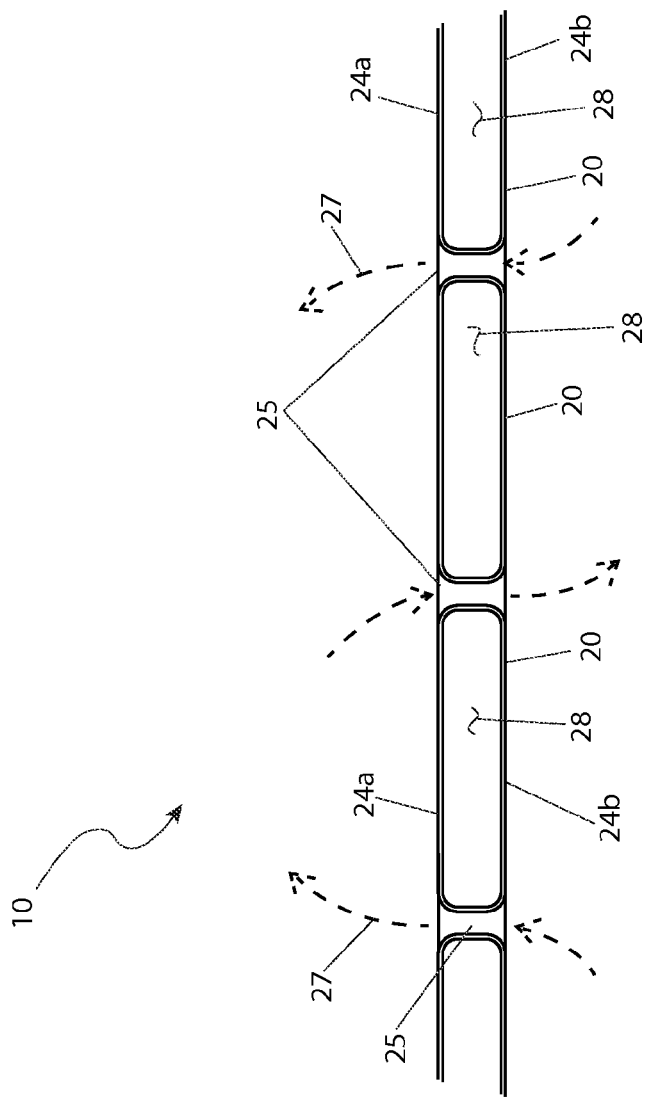

Referring now to FIG. 4, a sectional view of the apparatus 10 taken along section line A-A (see FIG. 3a), according to a preferred embodiment of the present invention, is disclosed. The apertures 25 provide tubular structures sealed along upper and bottom portions to respective outer layer 24a and inner layer 24b portions of the cover 20, thereby acting to mechanically join the outer 24a and inner 24b layers. During use, the apertures 25 also provide a means to equalize external air pressure along outer 24a and inner 24b surfaces of the cover 20 due to windy conditions, thereby helping to stabilize the position of the apparatus 10 upon the vehicle 100.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1

The method of installing and utilizing the apparatus 10 may be achieved by performing the following steps: acquiring a model of the apparatus 10 being particularly sized to cover all top surfaces of an intended vehicle 100; unfolding or unrolling the cover 20; placing the cover 20 upon upper surfaces of the vehicle 100; retaining the cover 20 upon the vehicle 100 by engaging the hook ends 36 of each securing strap 30 to the undercarriage and/or similar feature of the vehicle 100, preferably such that the inflating tube portion 40 is positioned above a driver's door portion of the vehicle 100; allowing a user to enter the vehicle 100; placing the inflating tube 40 within the vehicle 100, preferably by routing it through the driver's door window portion; opening the valve 44, if not previously opened; inflating the cover 20 by manually blowing air into the inflating tube 40, or; connecting the inflating tube 40 to a compressed air source 60 equipped with hose and barbed fitting 62 portions to connect and conduct air through the inflating tube 40 and into the interior 28 of the cover 20; closing the valve 44; enabling the cover 20 to shield the vehicle 100 during a period of damaging weather such as a hail or sleet storm; opening the valve 44 to deflate the air within the cover 20 out through the inflating tube 40; folding or rolling the cover 20 for storage, as desired; storing the device 10 until needed again; and, benefiting from protection of a vehicle 100 from damaging projectile-type weather events afforded a user of the present invention 10.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A covering, comprising:
    an inflatable cover having an inner layer, an outer layer, and a perimeter edge comprising a front edge, a rear edge, a right side edge, and a left side edge, wherein said inflatable cover is configured to form an interior between said inner layer and outer layer adapted to be repeatedly filled with, and discharged of, fluid;
    an inflating tube extending from one location of said perimeter edge and configured to be in fluid communication with said interior;
    a valve to selectively permit flow of said fluid to and from said interior via said inflating tube;
    at least one securing strap attached to one location of said perimeter edge and configured to removably secure said covering to an ancillary object; and,
    a plurality of apertures formed into said inflatable cover, each configured to extend from said outer layer to said inner layer without disturbing fluid containment within said interior;
    wherein said covering is configured to be placed on top of said ancillary object, removably secured to said ancillary object, and selectively inflated and deflated via said inflation tube and said valve means.

2. A covering, comprising:
    an inflatable cover having an inner layer, an outer layer, and a perimeter edge comprising a front edge, a rear edge, a right side edge, and a left side edge, wherein:
        said inflatable cover is configured to form an interior between said inner layer and outer layer and adapted to be repeatedly filled with, and discharged of, fluid;
        said inflatable cover is configured to provide impact protection when inflated; and,
    an inflating tube extending from one location of said perimeter edge and configured to be in fluid communication with said interior, wherein said inflating tube is connected to said inflatable cover via an adapter having a valve to selectively permit flow of said fluid to and from said interior via said inflating tube;

at least one securing strap attached to one location of said perimeter edge and configured to removably secure said covering to an ancillary object; and, a plurality of apertures formed into said inflatable cover, each configured to extend from said outer layer to said inner layer without disturbing fluid containment within said interior;

wherein said covering is configured to be placed on top of said ancillary object, removably secured to said ancillary object, and selectively inflated and deflated via said inflation tube and said valve means.

3. The covering recited in claim 2, wherein said valve means is a quarter-turn ball valve.

4. The covering recited in claim 2, wherein said inflatable tube and said adapter are configured to receive pressurized air from a human mouth using human lung capacity.

5. The covering recited in claim 2, wherein said inflatable tube and said adapter are configured to receive pressurized air from an ancillary compressed air source adapted with a coupling means to fluidly connect said ancillary compressed air source to said inflatable tube.

6. The covering recited in claim 2, wherein at least one of said securing strap is elastic.

7. The covering recited in claim 2, further comprising a fastener disposed on a distal end of at least one of said securing strap to removably secure said covering to said ancillary object.

8. The covering recited in claim 7, wherein said fastener means comprises a hook.

9. A covering configured to be removably attached to a vehicle, comprising:
   an inflatable cover having an inner layer, an outer layer, and a perimeter edge comprising a front edge, a rear edge, a right side edge, and a left side edge, wherein:
      said inflatable cover is configured to form an interior between said inner layer and outer layer and adapted to be repeatedly filled with, and discharged of, fluid;
      said inflatable cover is configured to provide impact protection when inflated;
      said inflatable cover is substantially rectangular forming four corners along said perimeter edge; and,
      said inflatable cover is configured to substantially cover all upper surfaces of said vehicle;
   an inflating tube extending from one location of said perimeter edge and configured to be in fluid communication with said interior, wherein said inflating tube is connected to said inflatable cover via an adapter having a valve means to selectively permit flow of said fluid to and from said interior via said inflating tube;
   a plurality of securing straps, each configured to removably secure said covering to a chassis of said vehicle, wherein a securing strap extends from each corner and at least one location of said perimeter edge; and,
   a plurality of apertures formed into said inflatable cover, each configured to extend from said outer layer to said inner layer without disturbing fluid containment within said interior;
   wherein said covering is configured to be placed on top of said vehicle, removably secured to said vehicle, and selectively inflated and deflated via said inflation tube and said valve means.

10. The covering recited in claim 9, wherein said valve means is a quarter-turn ball valve.

11. The covering recited in claim 9, wherein said inflatable tube and said adapter are configured to receive pressurized air from a human mouth using human lung capacity.

12. The covering recited in claim 9, wherein said inflatable tube and said adapter are configured to receive pressurized air from an ancillary compressed air source adapted with a coupling means to fluidly connect said ancillary compressed air source to said inflatable tube.

13. The covering recited in claim 9, wherein at least one of said securing strap is elastic.

14. The covering recited in claim 9, further comprising a fastener means disposed on a distal end of at least one of said securing strap to removably secure said covering to said chassis.

15. The covering recited in claim 14, wherein said fastener means comprises a hook.

16. The covering recited in claim 9, further comprising:
   at least one eyelet disposed on said perimeter edge and said corner; and,
   wherein each securing strap extending from said cover is routed through said eyelet and secured onto itself via an attachment means.

17. The covering recited in claim 16, wherein said attachment means comprises a crimp-type fastener.

18. The covering recited in claim 9, wherein said inflatable tube is configured to be selectively routed through a window of said vehicle and accessed by an occupant of said vehicle while said covering is placed on top of said vehicle.

19. The covering recited in claim 9, wherein said plurality of apertures is configured to equalize external air pressure along said outer and inner layers.

20. The covering recited in claim 9, wherein said plurality of apertures is arranged in rows substantially parallel and orthogonal to each other.

* * * * *